US011111976B2

(12) United States Patent
Kim (10) Patent No.: US 11,111,976 B2
(45) Date of Patent: Sep. 7, 2021

(54) METHOD AND APPARATUS FOR MANUFACTURING BRAKE PAD FOR QUALITY STABILIZATION (71) Applicant: KB AUTOSYS CO., LTD, Asan (KR)

(72) Inventor: Yong Woong Kim, Cheonan (KR)

(73) Assignee: KB AUTOSYS CO., LTD, Asan (KR)

(*) Notice: Subject to any disclaimer, the term of this patent is extended or adjusted under 35 U.S.C. 154(b) by 0 days.

(21) Appl. No.: 16/500,375

(22) PCT Filed: Nov. 12, 2018

(86) PCT No.: PCT/KR2018/013717
§ 371 (c)(1),
(2) Date: Oct. 2, 2019

(87) PCT Pub. No.: WO2019/151621
PCT Pub. Date: Aug. 8, 2019

(65) Prior Publication Data
US 2020/0386288 A1 Dec. 10, 2020

(30) Foreign Application Priority Data

Jan. 31, 2018 (KR) .................. 10-2018-0012057

(51) Int. Cl.
F16D 69/04 (2006.01)
(52) U.S. Cl.
CPC ...... F16D 69/04 (2013.01); F16D 2069/0475 (2013.01); F16D 2069/0483 (2013.01);
(Continued)
(58) Field of Classification Search
None
See application file for complete search history.

(56) References Cited

U.S. PATENT DOCUMENTS 4,279,696 A * 7/1981 Piersol .................. D21H 23/48
162/146
2016/0069408 A1* 3/2016 Hattori .................. F16D 69/026
523/156

FOREIGN PATENT DOCUMENTS

CN 1183520 A 6/1998
CN 1865728 A 11/2006
(Continued)

OTHER PUBLICATIONS

International Search Report dated Feb. 21, 2019 for PCT application No. PCT/KR2018/013717.
(Continued)

Primary Examiner — Monica A Huson
Assistant Examiner — Kelsey C Grace (57) ABSTRACT The present invention relates to a method and an apparatus for manufacturing a brake pad, which are configured to stabilize quality of the brake pad. The present invention provides a method of manufacturing a brake pad including a friction material and a backing plate which are coupled to each other, the method including: a preliminary process of preparing friction material powder and the backing plate; a forming process of forming the friction material powder in the form of the friction material and attaching the friction material to one surface of the backing plate; a quality stabilization process of heating and pressing the friction material after the forming process is completed; a heat treatment process of heating the brake pad at a predetermined temperature after the quality stabilization process is completed; and a grinding process of grinding the friction material.

5 Claims, 7 Drawing Sheets (52) U.S. Cl.
CPC .......... *F16D 2069/0491* (2013.01); *F16D 2200/0021* (2013.01); *F16D 2250/0023* (2013.01); *F16D 2250/0038* (2013.01); *F16D 2250/0061* (2013.01); *F16D 2250/0092* (2013.01)

(56) References Cited

FOREIGN PATENT DOCUMENTS

| | | |
|---|---|---|
| CN | 103103868 A | 5/2013 |
| JP | H07167173 A | 7/1995 |
| JP | 2551130 B2 | 11/1996 |
| JP | 2003083374 A | 3/2003 |
| JP | 2007056959 A | 3/2007 |
| KR | 1020060125479 A | 12/2006 |
| KR | 1020080021171 A | 3/2008 |
| KR | 100965613 B1 | 6/2010 |
| KR | 1020120013702 A | 2/2012 |

OTHER PUBLICATIONS

Written Opinion dated Feb. 21, 2019 for PCT application No. PCT/KR2018/013717.

\* cited by examiner

METHOD AND APPARATUS FOR MANUFACTURING BRAKE PAD FOR QUALITY STABILIZATION

CROSS REFERENCE TO RELATED APPLICATION

This application is a national stage application, filed under 35 U.S.C. § 371, of International Patent Application No. PCT/KR2018/013717, filed on Nov. 12, 2018, which claims the priority of Korean application No. 10-2018-0012057 filed on Jan. 31, 2018, the contents of which are incorporated by reference.

TECHNICAL FIELD

The present invention relates to a method and an apparatus for manufacturing a brake pad. In more detail, the present invention relates to a method and an apparatus for manufacturing a brake pad for quality stabilization which are configured to stabilize quality of the brake pad.

BACKGROUND ART

A brake pad is used for a braking system for a vehicle. In general, the brake pad includes a friction material configured to come into frictional contact with a brake disc during braking, and a backing plate configured to support the friction material.

A process of manufacturing the brake pad includes preparing the backing plate and preparing friction material powder for forming the friction material (preliminary process), preforming the friction material powder in the form of the friction material and attaching the preformed friction material to one surface of the backing plate (forming process), clamping, by using a pressing jig, the brake pad including the friction material attached to the backing plate (clamping process), heat-treating the brake pad in the state in which the brake pad is clamped with the pressing jig (heat treatment process), and grinding the friction material after the heat treatment is completed (grinding process).

In the past, the process of manufacturing the brake pad has been highly dependent on manual work, but there has been an effort to introduce an automation process. As an example, regarding the forming process, Korean Patent Application Laid-Open No. 10-2008-0021171 discloses a method of manufacturing a friction material for a brake pad that manufactures, through an automation process, a friction material cake used for the friction material used for the brake pad. In addition, regarding the grinding process, Korean Patent No. 10-0965613 discloses a brake pad grinding device that automatically grinds a friction material of a brake pad.

Regarding the clamping process, as an example of automating a process of aligning multiple brake pads with a pressing jig, Korean Patent Application Laid-Open No. 10-2012-0013702 discloses a brake pad pressing device using a pressing jig.

However, there is a drawback in that the brake pad pressing device disclosed in Korean Patent Application Laid-Open No. 10-2012-0013702 has a complicated configuration. For this reason, the clamping process is still dependent on an operator's manual work during the current process of manufacturing the brake pad. The manual clamping process cannot accurately control a pressing pressure generated by a spring nor maintain a constant pressure applied to the brake pad due to the operator's skill or the like, which causes a quality defect. In addition, a large amount of working time is required to align the multiple brake pads with the pressing jig.

Meanwhile, the heat treatment process, which is performed in the state in which the brake pad is clamped with the pressing jig during the process of manufacturing the brake pad, typically requires 5 to 12 hours, which causes a problem of deterioration in productivity.

DISCLOSURE

Technical Problem

In the case of the current process of manufacturing a brake pad, it has been considered that the heat treatment process is usually performed in the state in which the brake pad is clamped with the pressing jig.

In contrast, an object of the present invention is to provide a method and an apparatus for manufacturing a brake pad, in which a clamping process using a pressing jig is omitted, such that time and labor required for a process of manufacturing a brake pad may be reduced and manufacturing quality of the manufactured brake pad may be stably maintained.

Technical Solution

The present invention provides a method of manufacturing a brake pad including a friction material and a backing plate which are coupled to each other, the method including: a preliminary process of preparing friction material powder and the backing plate; a forming process of forming the friction material powder in the form of the friction material and attaching the friction material to one surface of the backing plate; a quality stabilization process of heating and pressing the friction material after the forming process is completed; a heat treatment process of heating the brake pad at a predetermined temperature after the quality stabilization process is completed; and a grinding process of grinding the friction material.

In the present invention, a separate pressing treatment need not be performed on the brake pad after the forming process is completed and before the quality stabilization process is performed.

The quality stabilization process may be performed by heating the friction material at a temperature of 110 to 260° C.

In addition, the quality stabilization process may be performed in a state in which a temperature of a portion of the friction material close to the backing plate is lower than a temperature of a portion of the friction material distant from the backing plate.

In addition, in the quality stabilization process, a side of the brake pad adjacent to the backing plate may be heated to a temperature of 110 to 160° C., and an end of the friction material opposite to the backing plate may be heated to a temperature of 190 to 260° C.

In addition, the quality stabilization process may be performed by pressing the friction material with a pressure of 5 to 20% of a pressure applied to the friction material powder in the forming process.

Meanwhile, the present invention provides an apparatus for manufacturing a brake pad including a friction material and a backing plate which are coupled to each other, the apparatus including: a forming device configured to form friction material powder in the form of the friction material and attach the formed friction material to the backing plate;

a quality stabilization device configured to heat and press the brake pad; and a heat treatment unit configured to heat the brake pad at a predetermined temperature.

In the exemplary embodiment, the quality stabilization device may include an upper stabilization mold, a lower stabilization mold, and an intermediate stabilization mold positioned between the upper stabilization mold and the lower stabilization mold and having an accommodation space formed penetratively at upper and lower sides thereof to accommodate the friction material of the brake pad.

Each of the upper stabilization mold and the lower stabilization mold may include a heating unit and heat the friction material to a temperature of 110 to 260° C.

In addition, the upper stabilization mold may heat the backing plate to a temperature of 110 to 160° C., and the lower stabilization mold may heat an end of the friction material to a temperature of 190 to 260° C.

In addition, the upper stabilization mold and the lower stabilization mold may press the friction material with 10 to 40 kgf/cm$^2$ by relatively moving toward each other in a state in which the brake pad is positioned.

In addition, the brake pad manufacturing apparatus may further include a transfer robot configured to transfer and load the brake pad to the quality stabilization device, unload the brake pad from the quality stabilization device, and transfer the brake pad to the heat treatment unit.

Advantageous Effects

According to the present invention, a clamping process using a pressing jig is omitted, such that time and labor required for a process of manufacturing a brake pad may be reduced and manufacturing quality of the manufactured brake pad may be stably maintained.

In addition, according to the present invention, the clamping process in the related art may be omitted and heat treatment process time may be reduced.

10: Brake pad
12: Friction material
14: Backing plate
20: Forming device
30: Quality stabilization device
200: Brake pad manufacturing apparatus
210: Friction material powder supply unit
220: Heat treatment unit
230: Grinding unit
240: Transfer robot

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 1:
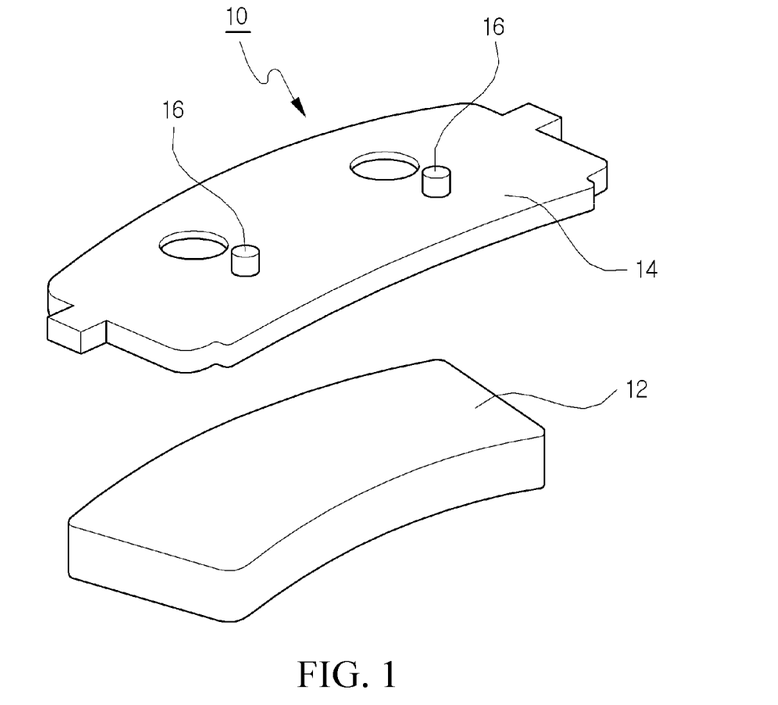
FIG. 1 is an exploded perspective view exemplarily illustrating a configuration of a brake pad.
Figure 2:
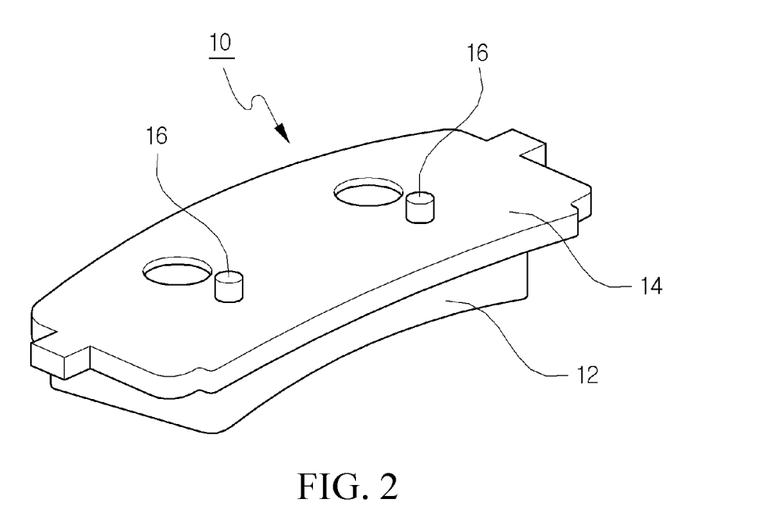
FIG. 2 is a perspective view exemplarily illustrating the configuration of the brake pad.

FIG. 1 is an exploded perspective view exemplarily illustrating a configuration of a brake pad, and FIG. 2 is a perspective view exemplarily illustrating the configuration of the brake pad.

A brake pad 10 includes a friction material 12 formed in the form of a cake formed by pressing friction material powder, and a backing plate 14 made of steel. An outer surface of the backing plate 14 may be provided with protrusions 16 used to couple the backing plate 14 to a brake system for a vehicle. The pair of protrusions 16 is disposed, one at either side, and positions of the protrusions 16 may be changed depending on a configuration of the brake system for a vehicle. In the case of the brake pad 10, the backing plate 14 may be securely attached to the friction material 12 by using, heating, and pressing a bonding agent applied onto an inner surface of the backing plate 14.

A brake pad manufacturing method according to the present invention completely manufactures the brake pad by primarily forming the friction material 12 in the form of a cake by using friction material powder, attaching the friction material 12 to the backing plate 14, performing a quality stabilization process, and then performing subsequent processes such as a grinding process.

Figure 3:
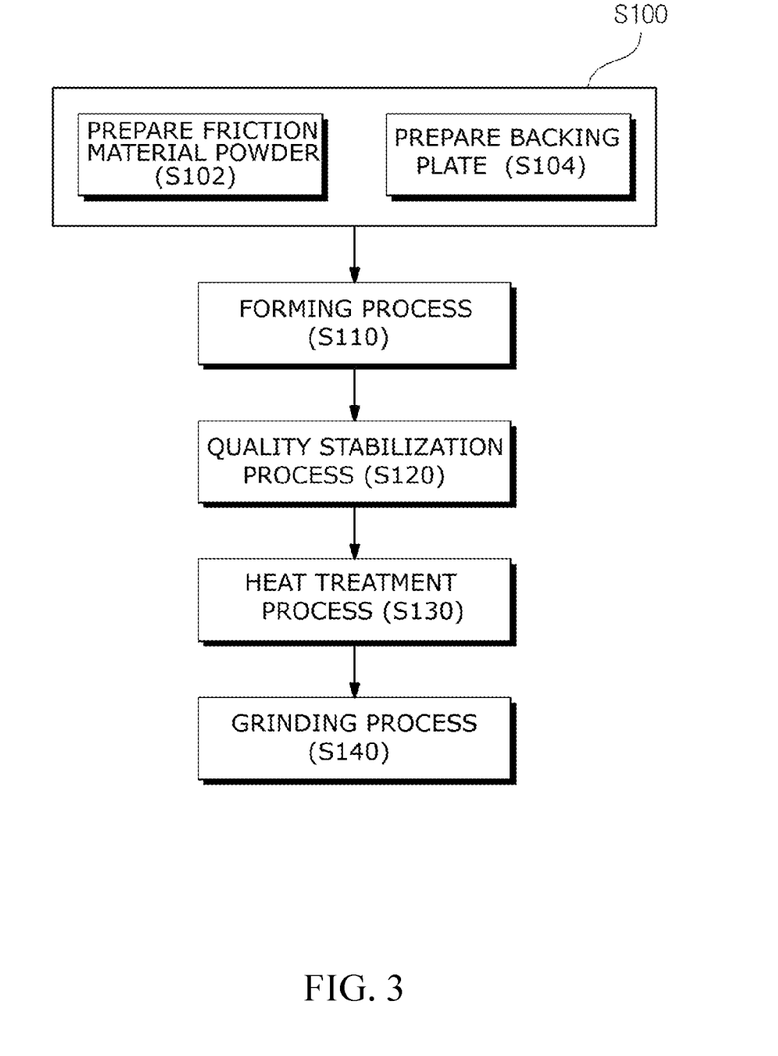
FIG. 3 is a flowchart illustrating a brake pad manufacturing method according to an exemplary embodiment of the present invention.
Figure 4A:
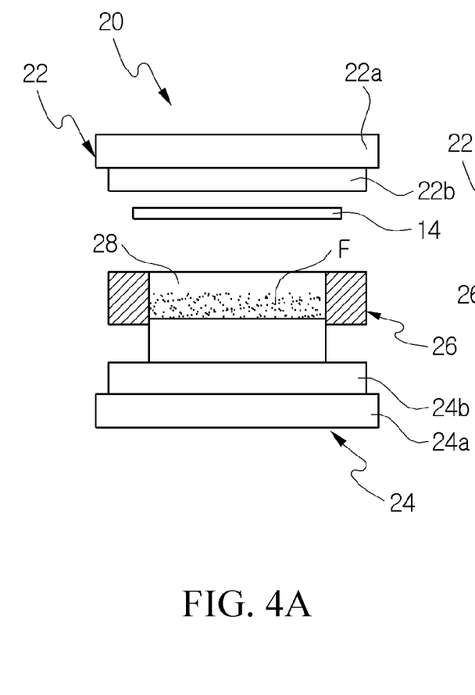
FIGS. 4A-4C are views illustrating a state in which a forming process is performed by using a forming device in the brake pad manufacturing method according to the exemplary embodiment of the present invention.
Figure 4B:
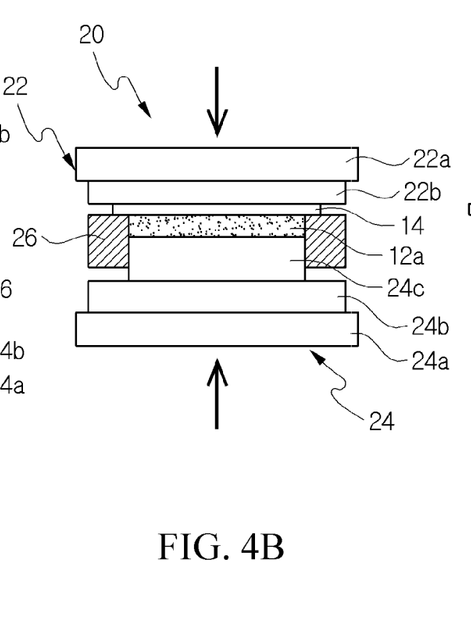
Figure 4C:
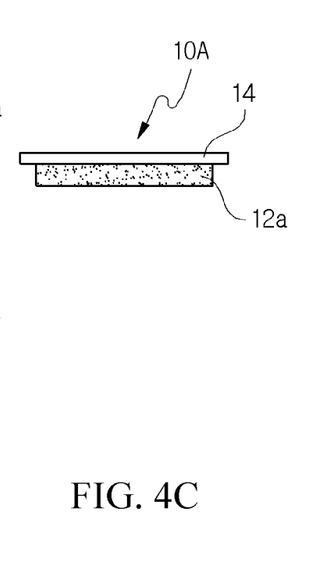
Figure 5A:
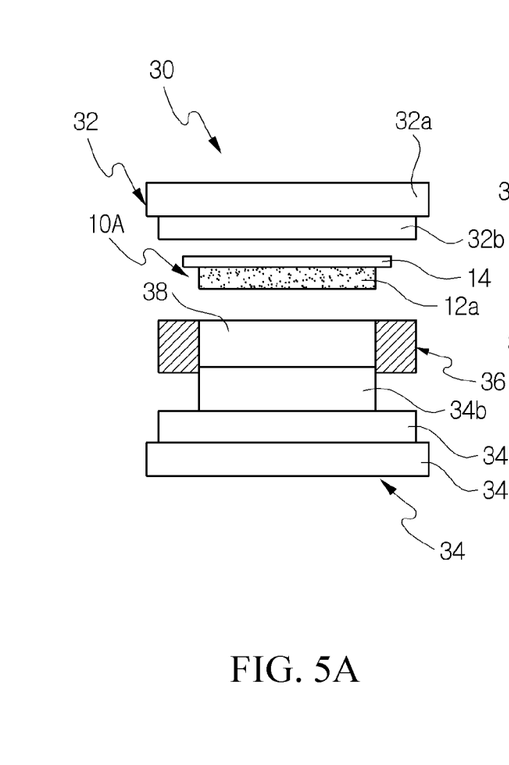
FIGS. 5A-5C are views illustrating a state in which a quality stabilization process is performed by using a quality stabilization device in the brake pad manufacturing method according to the exemplary embodiment of the present invention.
Figure 5B:
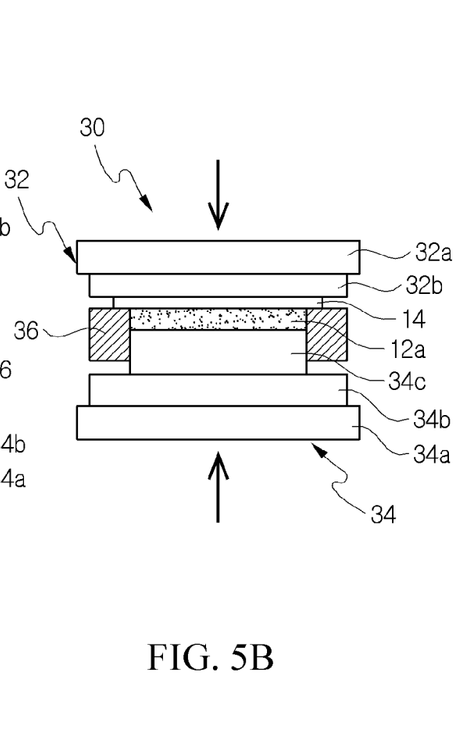
Figure 5C:
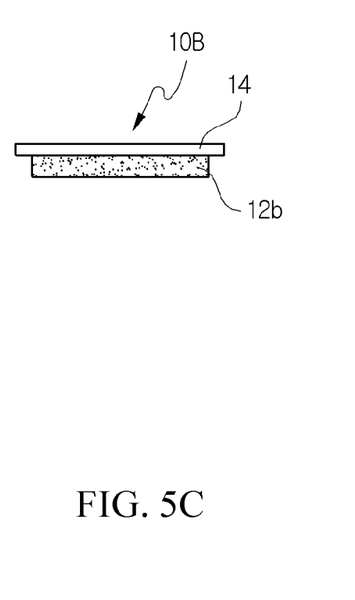

FIG. 3 is a flowchart illustrating a brake pad manufacturing method according to an exemplary embodiment of the present invention. FIGS. 4A-4C are views illustrating a state in which a forming process is performed by using a forming device in the brake pad manufacturing method according to the exemplary embodiment of the present invention, and FIGS. 5A-5C are views illustrating a state in which a quality stabilization process is performed by using a quality stabilization device in the brake pad manufacturing method according to the exemplary embodiment of the present invention.

The brake pad manufacturing method according to the exemplary embodiment of the present invention includes a preliminary process S100 of preparing friction material powder and the backing plate 14, a forming process S110 of forming the friction material powder in the form of the friction material and attaching the friction material to one surface of the backing plate 14, a quality stabilization process S120 of stabilizing quality of the friction material under a heating and pressing condition, a heat treatment process S130 of performing a heat treatment by heating the friction material, and a grinding process S140 of processing an edge of the friction material or forming a groove.

According to one aspect of the brake pad manufacturing method according to the present invention, a clamping process of pressing the multiple brake pads 10 by using a pressing jig in the related art is omitted.

That is, in the related art, the multiple brake pads 10 are loaded onto the pressing jig after the forming process is completed, and the heat treatment is performed in the state in which the brake pads 10 are loaded onto the pressing jig. However, in the present invention, the heat treatment is performed in a state in which the brake pad is loaded into an oven for a heat treatment after the quality stabilization process S120 is completed. Therefore, according to the present invention, the brake pad may be easily manufactured and quality deviation caused by manual work may be reduced.

The preliminary process S100 may include preparing the friction material powder (S102) and preparing the backing plate (S104). The preparing of the friction material powder (S102) is a step of preparing a material mixture for forming the friction material 12. The preparing of the backing plate (S104) may include preparing the backing plate 14 made of steel, and applying the bonding agent onto one surface of the backing plate 14. The friction material powder may have various compositions in accordance with characteristics of a vehicle using the brake pad, a mounting position of the brake pad, and the like.

The forming process S110 will be described with reference to FIG. 3 and FIGS. 4A-4C.

The forming process S110 includes forming a friction material 12a by using the friction material powder F, and attaching the formed friction material 12a to one surface of the backing plate 14. The friction material 12a is formed by measuring the friction material powder F, inputting the friction material powder F into a forming device 20 for forming the friction material 12a, and maintaining the friction material powder F under a predetermined pressure and at a predetermined temperature for a predetermined period of time.

The forming device 20 may include an upper forming mold 22, a lower forming mold 24, and an intermediate forming mold 26 positioned between the upper forming mold 22 and the lower forming mold 24.

In the exemplary embodiment, the upper forming mold 22 includes an upper forming/heating unit 22a, and an upper forming/pressing unit 22b coupled to a lower end of the upper forming/heating unit 22a. The lower forming mold 24 includes a lower forming/heating unit 24a, a first lower forming/pressing unit 24b provided at an upper end of the lower forming/heating unit 24a, and a second lower forming/pressing unit 24c provided on an upper portion of the first lower forming/pressing unit 24b. The intermediate forming mold 26 includes an insertion space 28 penetratively formed at upper and lower sides thereof.

As illustrated in FIG. 4A, the friction material powder F is inputted into the insertion space 28 in a state in which the second lower forming/pressing unit 24c of the lower forming mold 24 is positioned under the insertion space 28 of the intermediate forming mold 26, and then the backing plate 14 is positioned between the upper forming mold 22 and the intermediate forming mold 26. Next, as illustrated in FIG. 4B, the upper forming mold 22 and the lower forming mold 24 are relatively moved toward the intermediate forming mold 26 and press the friction material powder F to form the friction material 12a. The upper forming/heating unit 22a of the upper forming mold 22 and the lower forming/heating unit 24a of the lower forming mold 24 generate predetermined heat and apply the heat to the friction material powder F to form the friction material 12a. A temperature of the heat applied to the friction material powder F may be approximately 100 to 200° C. In addition, a pressure applied to the friction material powder F pressed by the upper forming mold 22 and the lower forming mold 24 may range from 50 to 800 kgf/cm$^2$. The upper forming mold 22 and the lower forming mold 24 may be operated by a hydraulic piston. In the forming process S110, air or gas included in the friction material powder F may be discharged to the outside by repeatedly increasing and decreasing the pressure applied to the friction material powder F. Meanwhile, the forming process S110 may be performed for approximately 100 to 800 seconds.

When the forming process S110 is completed, a primary brake pad 10A having the friction material 12a formed and attached to the backing plate 14 is completely manufactured, as illustrated in FIG. 4C.

Meanwhile, the description described with reference to FIGS. 4A-4C discloses the example in which both of the formation of the friction material 12a and the attachment of the backing plate 14 are performed by the forming device 20. However, as another exemplary embodiment of the present invention, the friction material 12a may be completely formed by heating, and pressing the friction material powder F, and then the formed friction material 12a may be attached to the backing plate 14.

The quality stabilization process S120 will be described with reference to FIG. 3 and FIGS. 5A-5C.

The quality stabilization process S120 is a step of stabilizing quality of the friction material 12a by applying a predetermined pressure and a predetermined temperature to the primary brake pad 10A formed in the forming process S110. The friction material 12a formed in the forming process S110 may not be in a state of being sufficiently compressed, such that a shape of the friction material 12a may be changed during the subsequent heat treatment process or the like. In the present invention, the quality stabilization process S120 stabilizes characteristics of the friction material 12a to make a friction material 12b, and then the heat treatment process S130 is performed.

The quality stabilization process S120 may be performed by maintaining the friction material 12a under a predetermined pressure and at a predetermined temperature for a predetermined period of time. In this case, a device capable of transmitting pressure and heat while maintaining the shape of the friction material 12a may be used. The quality stabilization process S120 may be variously performed in accordance with the substance and the characteristics of the friction material 12a.

Referring to FIGS. 5A and 5B, the quality stabilization process S120 may be performed by using a quality stabilization device 30 that heats and presses the primary brake pad 10A under a predetermined pressure.

The quality stabilization device 30 may include an upper stabilization mold 32, a lower stabilization mold 34, and an intermediate stabilization mold 36 positioned between the upper stabilization mold 32 and the lower stabilization mold 34.

In the exemplary embodiment, the upper stabilization mold 32 includes an upper stabilizing/heating unit 32a, and an upper stabilizing/pressing unit 32b coupled to a lower end of the upper stabilizing/heating unit 32a. The lower stabilization mold 34 includes a lower stabilizing/heating unit 34a, a first lower stabilizing/pressing unit 34b provided at an upper end of the lower stabilizing/heating unit 34a, and a second lower stabilizing/pressing unit 34c provided on an upper portion of the first lower stabilizing/pressing unit 34b. The intermediate stabilization mold 36 includes an insertion space 38 penetratively formed at upper and lower sides thereof.

As illustrated in FIG. 5A, the primary brake pad 10A is positioned in the intermediate stabilization mold 36. Next, as illustrated in FIG. 5B, the quality stabilization process is performed by relatively moving the upper stabilization mold 32 and the lower stabilization mold 34 toward the intermediate stabilization mold 36 to press the friction material 12a. In this case, heat is transferred to the primary brake pad 10A by the upper stabilizing/heating unit 32a and the lower stabilizing/heating unit 32b.

When the quality stabilization process S120 is performed in the state illustrated in FIG. 5B, a temperature of the friction material 12a may be 110 to 260° C., and a pressure applied to the friction material may be 5 to 20% of the pressure applied to the friction material powder in the forming process S110. As an example, when the pressure applied to the friction material powder F in the forming process S110 ranges from 200 to 800 kgf/cm$^2$, the pressure applied to the friction material in the quality stabilization process S120 may be 10 to 40 kgf/cm$^2$. In addition, the quality stabilization process S120 may be performed by maintaining the above-mentioned condition for 100 to 800 seconds, more particularly, 400 to 700 seconds.

The friction material powder F may include a mixture of a friction adjusting agent, a reinforcing agent, a coupling agent, and the like, and there may be a problem in that the coupling agent typically made of resin or the like is not sufficiently cured if a temperature of the friction material 12a is lower than 110° C. in the quality stabilization process S120. In addition, there may be a problem in that a crack is formed in the friction material 12a or the friction material 12a is expanded if a temperature of the friction material 12a is higher than 260° C.

When performing the quality stabilization process S120 by using the quality stabilization device 30 illustrated in FIGS. 5A and 5B, the upper stabilization mold 32 may be heated to a temperature of 110 to 160° C., and the lower stabilization mold 34 may be heated to a temperature of 190 to 260° C. Therefore, a temperature of a portion of the friction material 12a distant from the backing plate 14 may be higher than a temperature of a portion of the friction material 12a close to the backing plate 14. It is ascertained that the shape of the friction material 12a is substantially maintained and the quality of the friction material 12a is stabilized within a predetermined range in a case in which a temperature gradient is formed as described above.

Meanwhile, if the pressure applied to the friction material 12a in the quality stabilization process S120 is low (e.g., lower than 10 kgf/cm$^2$), the stabilization of the shape and the quality of the friction material 12a is not particularly affected. If the pressure is high (e.g., higher than 40 kgf/cm$^2$), there may be a problem in that a change in shape of the friction material 12a and the quality characteristics of the friction material 12a cannot be managed within a predetermined range.

When the quality stabilization process is performed as illustrated in FIG. 5B, a secondary brake pad 10B, which has the friction material 12b having stabilized quality and attached to the backing plate 14, is completely made, as illustrated in FIG. 5C.

Thereafter, the heat treatment process S130 is performed.

The heat treatment process S130 is a step of curing the friction material 12b by heat-treating, at a predetermined temperature, the brake pad 10B having material characteristics stabilized by the quality stabilization process S120. The heat treatment process may be performed by inputting the brake pad 10B, which has been subjected to the quality stabilization process S120, into an oven at a predetermined temperature without applying a separate pressure to the brake pad 10B.

In the present invention, since the characteristics of the friction material 12b are stabilized by the pressure and the heat in the quality stabilization process S120, the heat treatment time in the heat treatment process S130 may be reduced in comparison with the related art. The heat treatment time of about 4 to 12 hours is required in the related art, but in the case of the present invention, the heat treatment may be sufficiently performed for the heat treatment time reduced to 20 to 60% of the heat treatment time in the related art.

In the exemplary embodiment, a temperature in the heat treatment process S130 may be set to be equal to or higher than a temperature in the quality stabilization process. For example, if the quality stabilization process is performed at a temperature of 200° C., the heat treatment process S130 may be performed at a temperature (e.g., 300° C.) higher than the temperature in the quality stabilization process.

The grinding process S140 is performed on the brake pad 10B after the heat treatment process S130 is completed. The grinding process S140 may include processing an edge of the friction material 12 of the brake pad 10B or forming a groove having a predetermined direction or a shape in a front surface of the friction material 12.

The brake pad 10 illustrated in FIG. 2 may be manufactured through the above-mentioned processes. Meanwhile, a finally finished product may be manufactured after additionally assembling accessories and the like required to mount the brake pad 10 to the vehicle after the grinding process S140 is completed.

Figure 6:
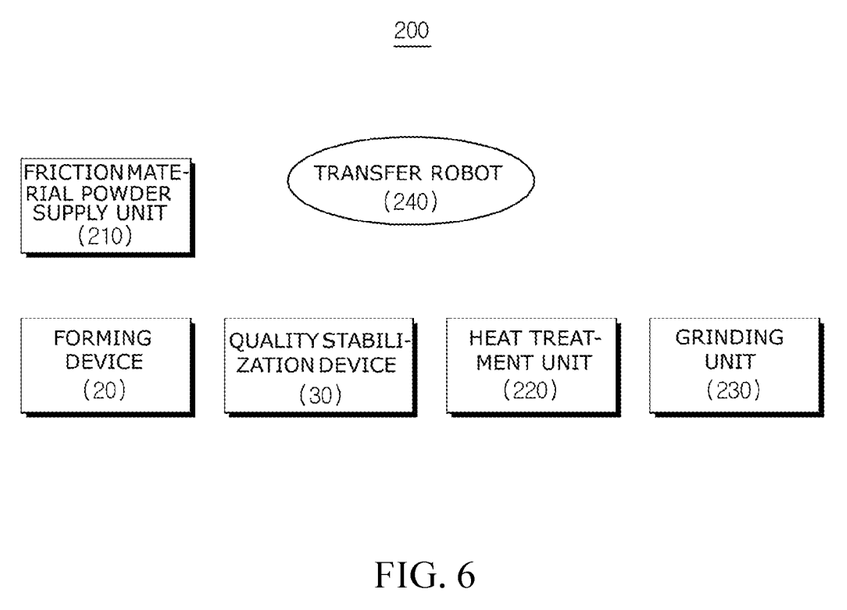
FIG. 6 is a view illustrating a schematic configuration of a brake pad manufacturing apparatus according to the exemplary embodiment of the present invention.
Figure 7A:
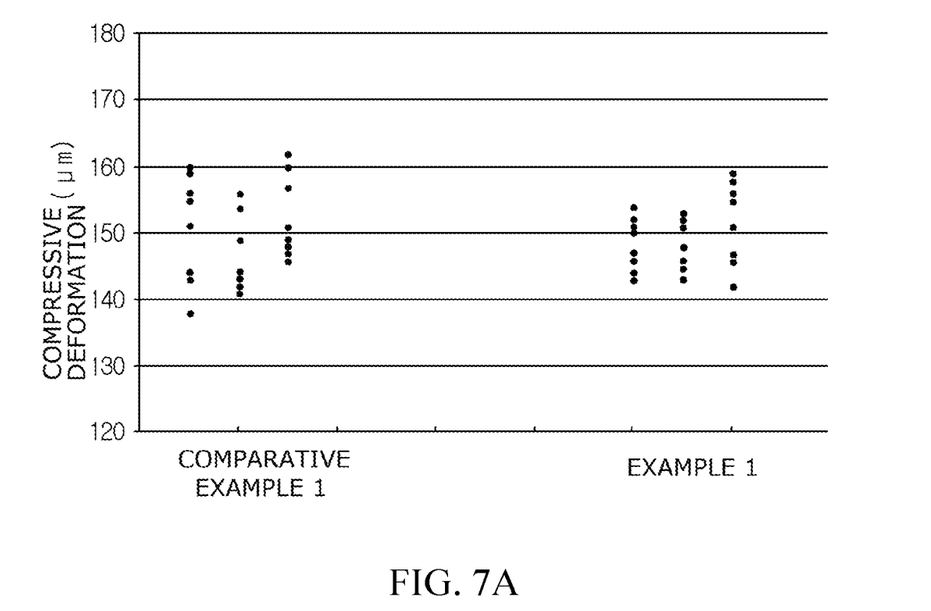
FIGS. 7A-7B are graphs illustrating quality characteristics (FIG. 7A illustrates compressive deformation and FIG. 7B illustrates hardness) of a brake pad manufactured by the brake pad manufacturing method according to the present invention and a brake pad manufactured by a manufacturing method in the related art.
Figure 7B:
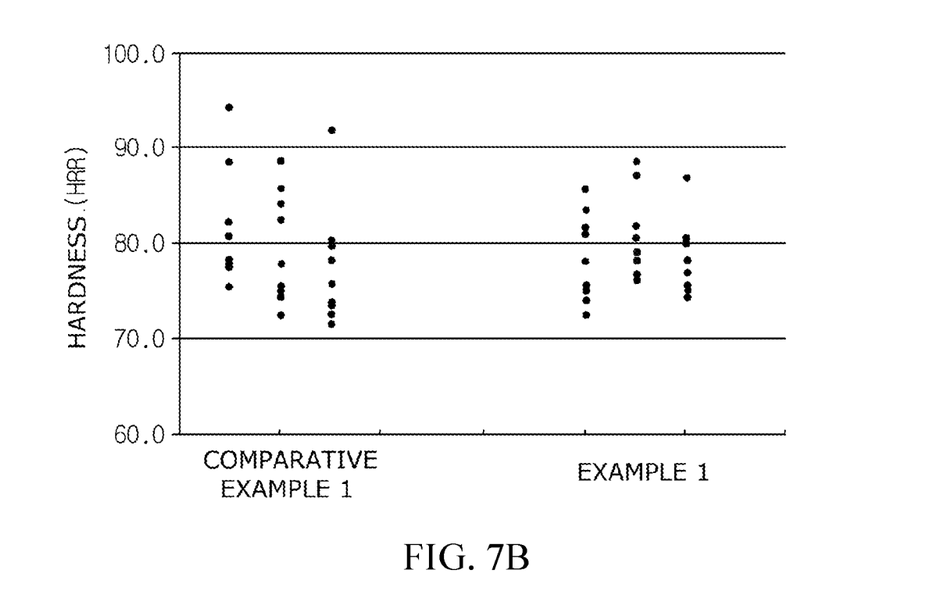
Figure 8A:
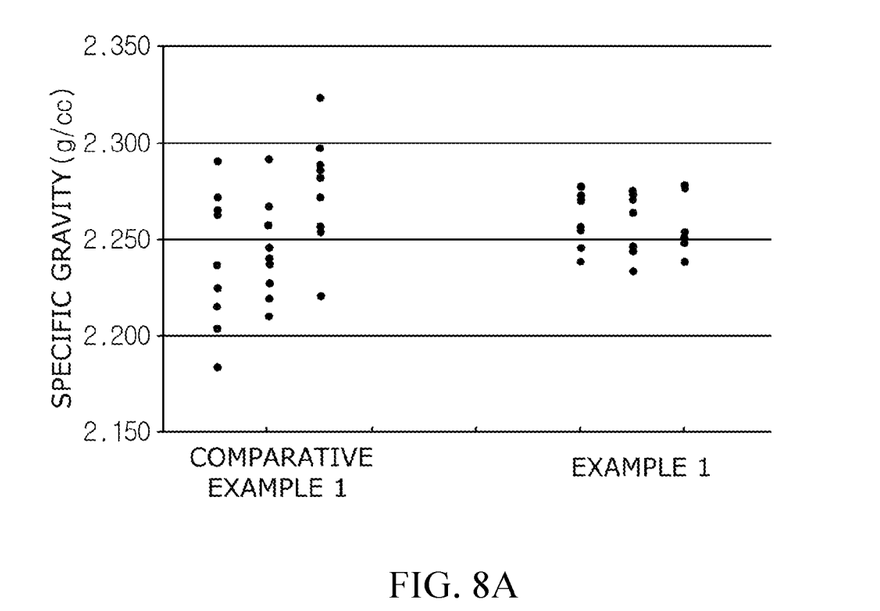
FIGS. 8A-8B are graphs illustrating quality characteristics (FIG. 8A illustrates specific gravity and FIG. 8B illustrates shear strength) of the brake pad manufactured by the brake pad manufacturing method according to the present invention and the brake pad manufactured by the manufacturing method in the related art.
Figure 8B:
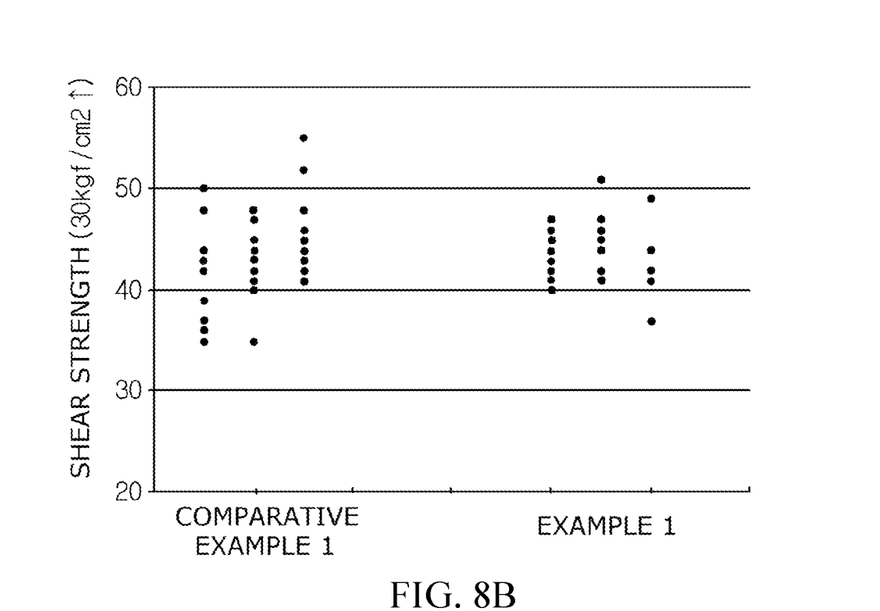

FIG. 6 is a view illustrating a schematic configuration of a brake pad manufacturing apparatus according to the exemplary embodiment of the present invention.

The brake pad manufacturing apparatus 200 according to the present invention may include a friction material powder supply unit 210, the forming device 20, the quality stabilization device 30, a heat treatment unit 220, and a grinding unit 230.

The friction material powder supply unit 210 serves to mix substances, which constitute the friction material powder, and to supply the friction material powder.

The forming device 20 forms the primary brake pad 10A by forming the friction material 12a by using the friction material powder, and attaching the friction material 12a to the backing plate 14.

The quality stabilization device 30 performs the quality stabilization process while heating and pressing the primary brake pad 10A.

After the quality stabilization process is performed by the quality stabilization device 20, the secondary brake pad 10B is transferred to the heat treatment unit 230. The heat treatment unit 230 may be configured in the form of an oven.

The grinding unit 240 grinds the friction material 12 of the brake pad 10 after the heat treatment is completed by the heat treatment unit 230.

Meanwhile, the brake pad manufacturing apparatus 200 according to the present invention may include a transfer robot 240 that transfers the friction material 12, the backing plate 14, or the brake pad 10 between the forming device 20, the quality stabilization device 30, the heat treatment unit 220, and the grinding unit 230.

The transfer robot 240 may include at least one end effector configured to hold a member to be transferred, and a drive unit configured to transfer the member. The end effector may be of a finger type, a vacuum type, or the like.

Examples

The brake pad manufactured according to the present invention was compared in terms of characteristics with the brake pad manufactured according to the related art to evaluate the brake pad manufacturing method according to the present invention.

The brake pad manufacturing method according to the related art method (Comparative Example 1) performed the clamping process of loading the multiple brake pads 10A onto the pressing jig after the forming process was completed, and performed the heat treatment process in the state in which the brake pads 10A were loaded onto the pressing jig.

In contrast, the brake pad manufacturing method according to the present invention (Example 1) performed the quality stabilization process on the brake pad 10A after the forming process was completed, and then performed the heat treatment. The quality stabilization process was performed by using the quality stabilization device 30 illustrated in FIG. 5A and FIG. 5B. In this case, a temperature of the upper stabilization mold 32 was 150° C., a temperature of the lower stabilization mold 34 was 200° C., and a pressing pressure was 10 kgf/cm².

Results (average values) of comparing the completely manufactured friction materials 12 in terms of physical characteristics (compressive deformation, specific gravity, hardness (HRR), and shear strength) are as shown in Table 1, and resulting values of samples of the multiple brake pads manufactured under the same condition are as illustrated in FIGS. 7A and 7B and FIGS. 8A and 8B.

TABLE 1

| Classification | Allowable tolerance | Example 1 | Comparative Example 1 |
|---|---|---|---|
| Compressive deformation (μm) 160 bar at room temperature | ±25 | 149 | 150 |
| Hardness (HRR) | ±20 | 79.7 | 79.5 |
| Specific gravity (g/cc) | ±0.1 | 2.256 | 2.239 |
| Shear strength (kgf/cm²) | MIN 30 | 37 | 35 |

In Table 1, the allowable tolerance is an applicant's own management criterion. Example 1 and Comparative Example 1 had approximately similar characteristics, and measured values in respect to the respective manufactured samples satisfied the allowable tolerance. Referring to FIGS. 7A-7B and 8A-8B, it can be ascertained that the deviation related to the physical characteristics of the brake pad manufactured according to Comparative Example 1 was high, whereas the deviation related to the physical characteristics of the brake pad manufactured according to Example 1 was significantly reduced.

That is, according to the present invention, the quality characteristics of the manufactured brake pad may be stabilized, and the product quality may be more easily managed.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the exemplary embodiments disclosed in the present invention and the accompanying drawings are intended not to limit but to describe the technical spirit of the present invention, and the scope of the technical spirit of the present invention is not limited by the exemplary embodiments and the accompanying drawings. The protective scope of the present invention should be construed based on the following claims, and all the technical spirit within the equivalent scope thereto should be construed as falling within the scope of the present invention.

The invention claimed is:

1. A method of manufacturing a brake pad including a friction material and a backing plate which are coupled to each other, the method comprising:
    a preliminary process of preparing friction material powder and the backing plate;
    a forming process of forming the friction material powder in the form of the friction material by pressing and attaching the friction material to one surface of the backing plate;
    a quality stabilization process of heating and pressing the friction material after the forming process is completed;
    a heat treatment process of heating the brake pad at a predetermined temperature after the quality stabilization process is completed; and
    a grinding process of grinding the friction material,
    wherein the quality stabilization process is performed by heating the friction material at a temperature of 110 to 260° C., and
    wherein the quality stabilization process is performed by pressing the friction material with a pressure of 5 to 20% of a pressure applied to the friction material powder in the forming process.

2. The method of claim 1, wherein a separate pressing treatment is not performed on the brake pad after the forming process is completed and before the quality stabilization process is performed.

3. The method of claim 1, wherein the quality stabilization process is performed in a state in which a temperature of a portion of the friction material close to the backing plate is lower than a temperature of a portion of the friction material distant from the backing plate.

4. The method of claim 3, wherein in the quality stabilization process, a side of the brake pad adjacent to the backing plate is heated to a temperature of 110 to 160° C., and an end of the friction material opposite to the backing plate is heated to a temperature of 190 to 260° C.

5. The method of claim 1, wherein the quality stabilization process is performed by pressing the friction material with the pressure of 10 to 40 kgf/cm².

* * * * *